United States Patent
Nie et al.

(10) Patent No.: US 11,417,363 B1
(45) Date of Patent: Aug. 16, 2022

(54) DATA STORAGE DEVICE CALIBRATING WRITE PARAMETER BY PRESSING ACTUATOR AGAINST CRASH STOP

(71) Applicant: Western Digital Technologies, Inc., San Jose, CA (US)

(72) Inventors: Jianbin Nie, Fremont, CA (US); Duc H. Banh, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/358,431

(22) Filed: Jun. 25, 2021

(51) Int. Cl.
| | |
|---|---|
| *G11B 20/18* | (2006.01) |
| *G11B 5/596* | (2006.01) |
| *G11B 21/10* | (2006.01) |
| *G11B 5/012* | (2006.01) |

(52) U.S. Cl.
CPC ............ *G11B 21/106* (2013.01); *G11B 5/012* (2013.01)

(58) Field of Classification Search
CPC . G11B 20/18; G11B 5/5547; G11B 20/10009; G11B 27/36; G11B 5/54; G11B 2020/10916; G11B 20/12; G11B 5/5539; G11B 5/59633; G11B 5/5965

USPC ....... 360/75, 48, 78.08, 76, 77.07, 77.08, 49
See application file for complete search history.

(56) References Cited

U.S. PATENT DOCUMENTS

| | | | |
|---|---|---|---|
| 5,226,027 A | * | 7/1993 | Bakx .................. G11B 7/126 369/53.22 |
| 7,068,451 B1 | | 6/2006 | Wang et al. |
| 7,457,071 B1 | | 11/2008 | Sheh |
| 7,499,236 B1 | | 3/2009 | Lee et al. |
| 7,529,055 B1 | | 5/2009 | Laks et al. |
| 7,656,604 B1 | | 2/2010 | Liang et al. |
| 8,085,489 B2 | | 12/2011 | Hattori et al. |
| 8,634,283 B1 | | 1/2014 | Rigney et al. |
| 8,873,183 B2 | | 10/2014 | Yasuna et al. |
| 9,117,479 B1 | | 8/2015 | Madison et al. |
| 9,230,605 B1 | * | 1/2016 | Moser ............. G11B 20/10305 |
| 2004/0125491 A1 | * | 7/2004 | Iseri .................. G11B 5/59633 360/48 |

* cited by examiner

*Primary Examiner* — Nabil Z Hindi (74) *Attorney, Agent, or Firm* — Patterson + Sheridan, LLP; Steven H. VerSteeg (57) ABSTRACT

A data storage device is disclosed comprising a head actuated over a disk surface by an actuator arm. The actuator is controlled to press the actuator arm against a crash stop in order to write a plurality of bursts on the disk surface each with a different write parameter setting. Each burst is read in order to measure a quality metric for each burst, and an operating setting for the write parameter is configured based on the measured quality metrics.

21 Claims, 6 Drawing Sheets

DATA STORAGE DEVICE CALIBRATING WRITE PARAMETER BY PRESSING ACTUATOR AGAINST CRASH STOP

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
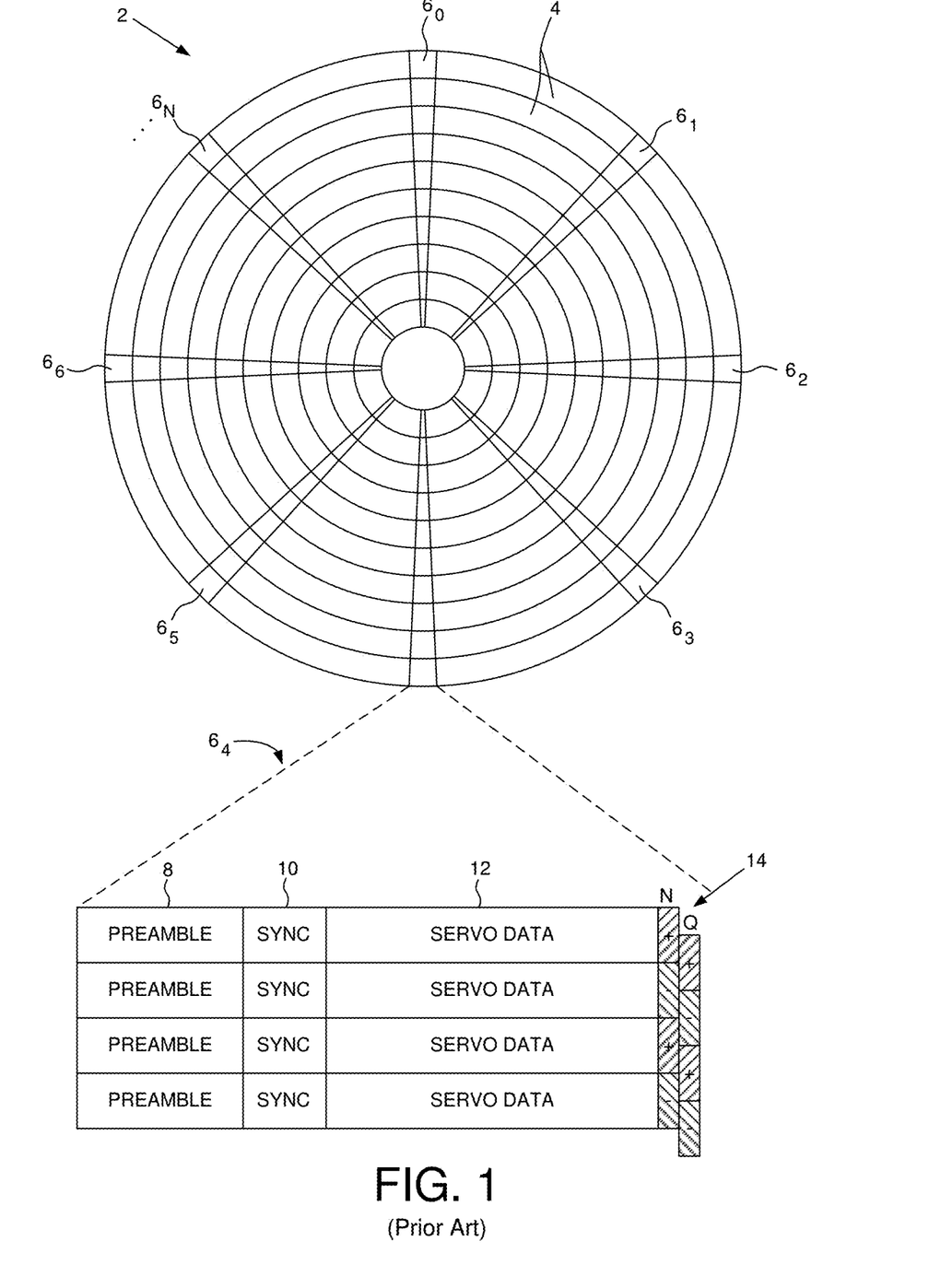
FIG. 1 shows a prior art disk format comprising a plurality of servo tracks defined by servo sectors.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to the disk by modulating a write current in an inductive coil (write coil) to record magnetic transitions onto the disk surface in a process referred to as saturation recording. During read-back, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface.

DETAILED DESCRIPTION

Figure 2A:
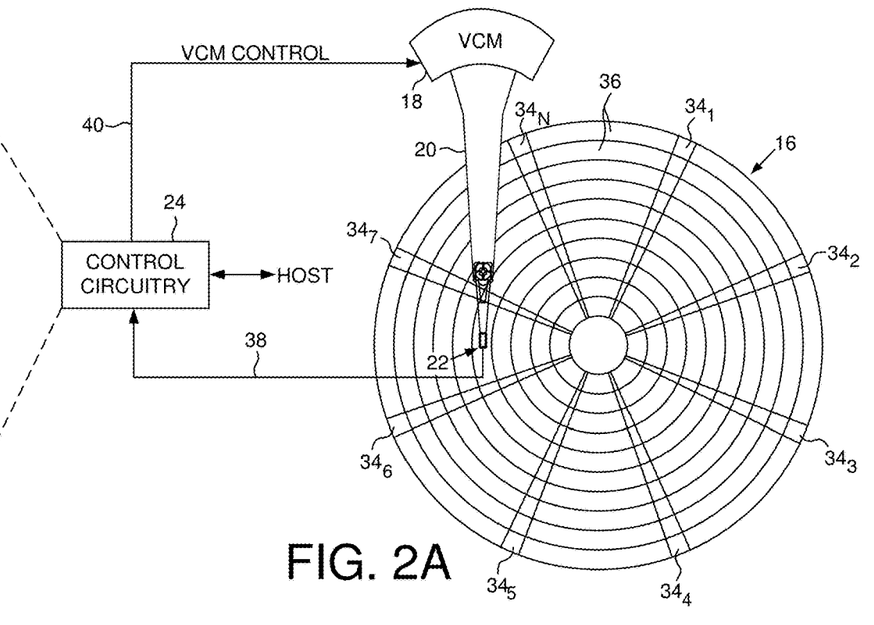
FIG. 2A shows a data storage device in the form of a disk drive according to an embodiment comprising a head actuated over a disk surface by an actuator arm.
Figure 2B:
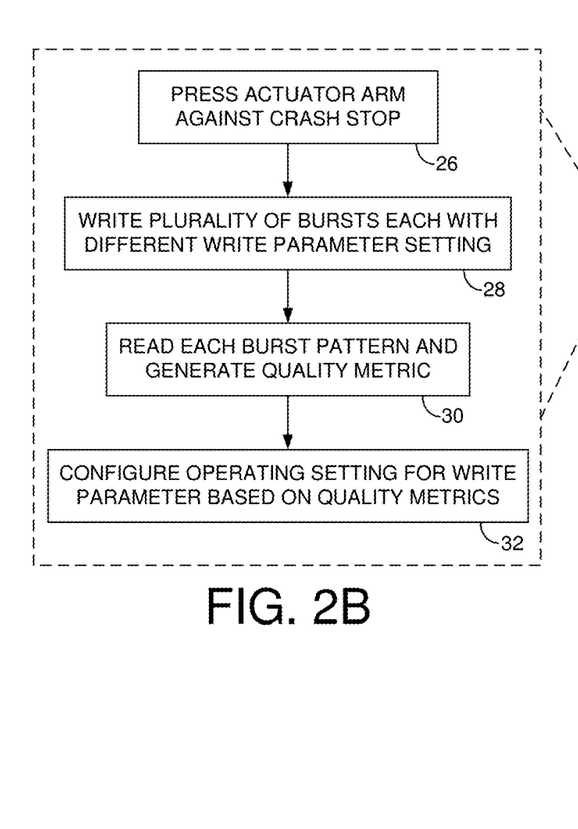
FIG. 2B is a flow diagram according to an embodiment wherein an operating setting for a write parameter is configured by pressing the actuator arm against a crash stop and writing/reading bursts at different write parameter settings.

FIG. 2A shows a data storage device in the form of a disk drive according to an embodiment comprising a disk surface 16, an actuator 18, an actuator arm 20 actuated by the actuator 18, and a head 22 actuated over the disk surface 16 by the actuator arm 20. The disk drive further comprises control circuitry 24 configured to execute the flow diagram of FIG. 2B, wherein the actuator arm is pressed against a crash stop (block 26) in order to write a plurality of bursts on the disk surface each with a different write parameter setting (block 28), and read each burst in order to measure a quality metric for each burst (block 30). An operating setting is configured for the write parameter based on the measured quality metrics (block 32).

In the embodiment of FIG. 2A, the disk surface 16 comprises a plurality of servo sectors $34_1$-$34_N$ that define a plurality of servo tracks, wherein data tracks 36 are defined relative to the servo tracks at the same or different radial density. The control circuitry 24 processes a read signal 38 emanating from the head to demodulate the servo sectors and generate a position error signal (PES) representing an error between the actual position of the head and a target position relative to a target track. A servo control system in the control circuitry 24 filters the PES using a suitable compensation filter to generate a control signal 40 applied to a coarse actuator 18 (e.g., VCM) which rotates an actuator arm 20 about a pivot in order to actuate the head radially over the disk in a direction that reduces the PES. The head may also be servoed using a fine actuator, such as a piezoelectric (PZT) actuator, configured to actuate a suspension relative to the actuator arm 20, and/or configured to actuate the head relative to the suspension. The servo sectors $34_1$-$34_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 2C:
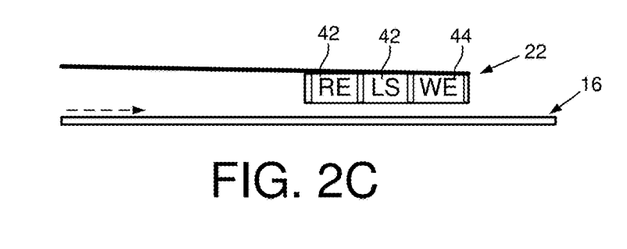
FIG. 2C shows a head according to an embodiment comprising a write element, a read element, and a write assist element in the form of a laser and near field transducer (NFT) configured to heat the disk during a write operation.

The head 22 may be fabricated with any suitable components, wherein FIG. 2C shows an embodiment with the head 22 comprising a suitable read element 42 (e.g., a magnetoresistive element), a write assist element in the form of a laser and NFT 42, and a write element 44 (e.g., a write coil). Other embodiments may employ a different type of write assist element, such as a STO in MAMR, or a material stack, including conductive materials, used in energy assisted recording. The head 22 may also comprise a suitable fly height actuator (not shown) that is biased to achieve a target fly height of the head 22 over the disk surface 16. Any suitable fly height actuator may be employed, such as a suitable thermal actuator that adjusts the fly height through thermal expansion, or a suitable mechanical actuator such as a suitable piezoelectric actuator that adjusts the fly height through mechanical deflection. In the embodiments described herein, an operating setting for any suitable write parameter may be configured by writing/reading bursts while the actuator is pressed against the crash stop, such as a current amplitude applied to the write coil, a bias applied to a write assist element, a bias applied to a fly height actuator, etc. In one embodiment, an operating setting may be configured for multiple write parameters by adjusting the write parameters individually or concurrently in any number of permutations when writing the bursts.

Figure 3A:
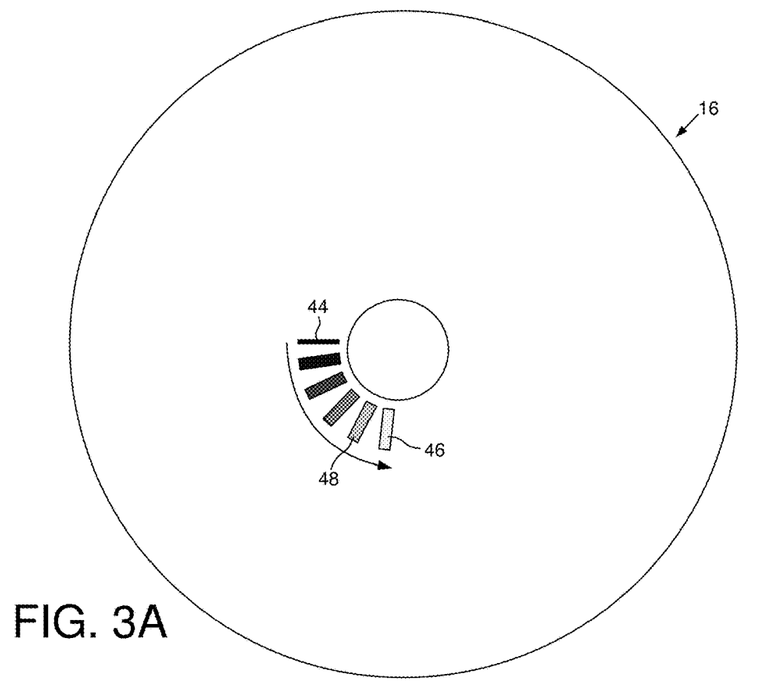
FIG. 3A shows an embodiment wherein a plurality of bursts are written/read while pressing the actuator arm against an inner diameter crash stop in order to configure an operating setting for a write parameter.
Figure 3B:
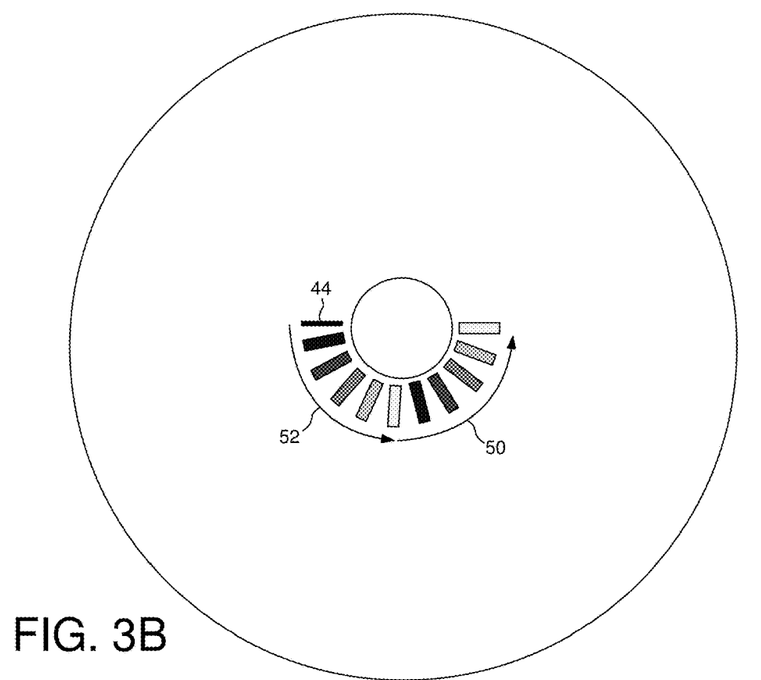
FIG. 3B shows an embodiment wherein multiple sets of bursts are written/read in order to configure an operating setting for multiple write parameters.

In one embodiment, the bursts are written at a target write angle around the circumference of the disk surface while the actuator is pressed against the crash stop. FIG. 3A shows an example of this embodiment wherein the actuator arm 20 is pressed against an inner diameter crash stop such that the head 22 is positioned near the inner diameter of the disk surface 16. As the disk surface 16 rotates, a burst is written by the head 22 when the disk surface reaches a target write angle (rotation angle). For example, the write coil 44 writes burst 46 at its corresponding write angle, writes burst 48 at its corresponding write angle, and so on. Prior to writing each burst, the control circuitry 24 adjusts the write parameter such that each burst is written with a different setting as represented by each burst having a different shade in FIG. 3A. Each servo burst may comprise any suitable pattern of magnetic transitions, such as a pattern having a single frequency of magnetic transitions, or multiple frequencies of magnetic transitions. FIG. 3B shows an embodiment wherein a first set of bursts 50 may be written each with a different setting for a first write parameter (e.g., write current applied to write coil), and a second set of bursts 52 written each with a different setting for a second write parameter (e.g., bias applied to a laser). In one embodiment, each set of burst may be written using a combination of write parameters, including any suitable permutation of write parameters. That is, in one embodiment changing the write parameter setting prior to writing each burst may comprise changing the setting(s) of one or more write parameters, or changing any suitable permutation of write parameters.

Figure 4:
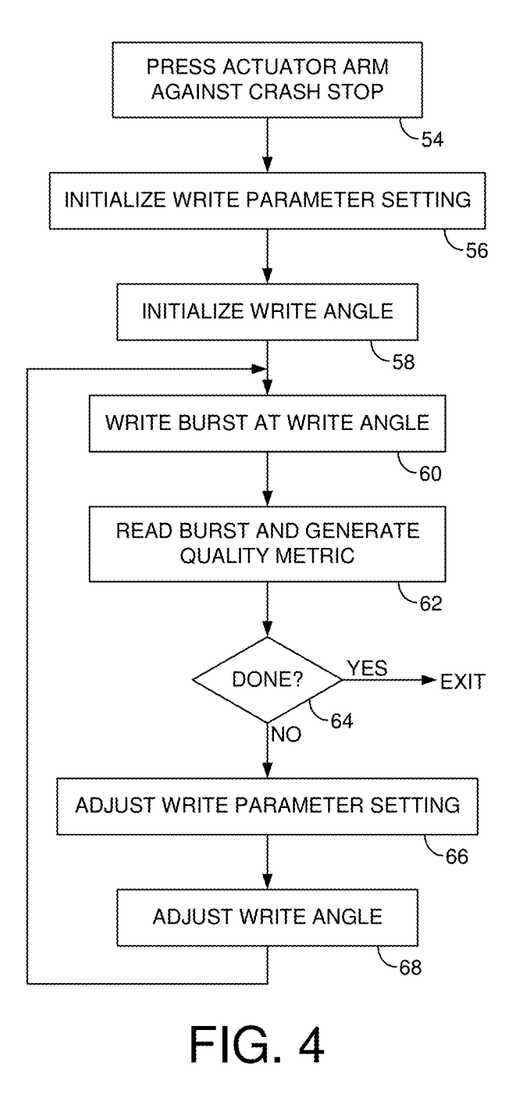
FIG. 4 is a flow diagram according to an embodiment wherein each burst is written/read with a different write parameter setting over individual revolutions of the disk surface.

FIG. 4 is a flow diagram according to an embodiment wherein after pressing the actuator arm against the crash stop (block 54), a write parameter setting is initialized at block 56 (e.g., to a low value) and a write angle is initialized (block 58). During a first revolution of the disk surface, a burst is written at the write angle (block 60), and during a second revolution of the disk surface, the burst is read in order to measure a quality metric (block 62). If not done at block 64, the write parameter setting is adjusted at block 66 (e.g., incremented) and the write angle is adjusted at bock 68 (e.g., incremented). The flow diagram is then repeated from block 60 in order to write/read the next burst using the adjusted write parameter setting. In one embodiment, the flow diagram of FIG. 4 terminates at block 64 when the quality metric measured at block 62 reaches a target value. Writing/reading the burst over multiple revolutions in this embodiment may help prevent the write parameter setting from overshooting so as to prevent damaging the corresponding write component. For example, overshooting a bias setting applied to a laser may overheat the laser and/or damage the NFT due to thermal expansion causing contact with the disk surface. Accordingly in this embodiment, the write parameter setting may be gradually incremented while writing the bursts over multiple revolutions and the quality metric measured until it reaches a target value.

Figure 5:
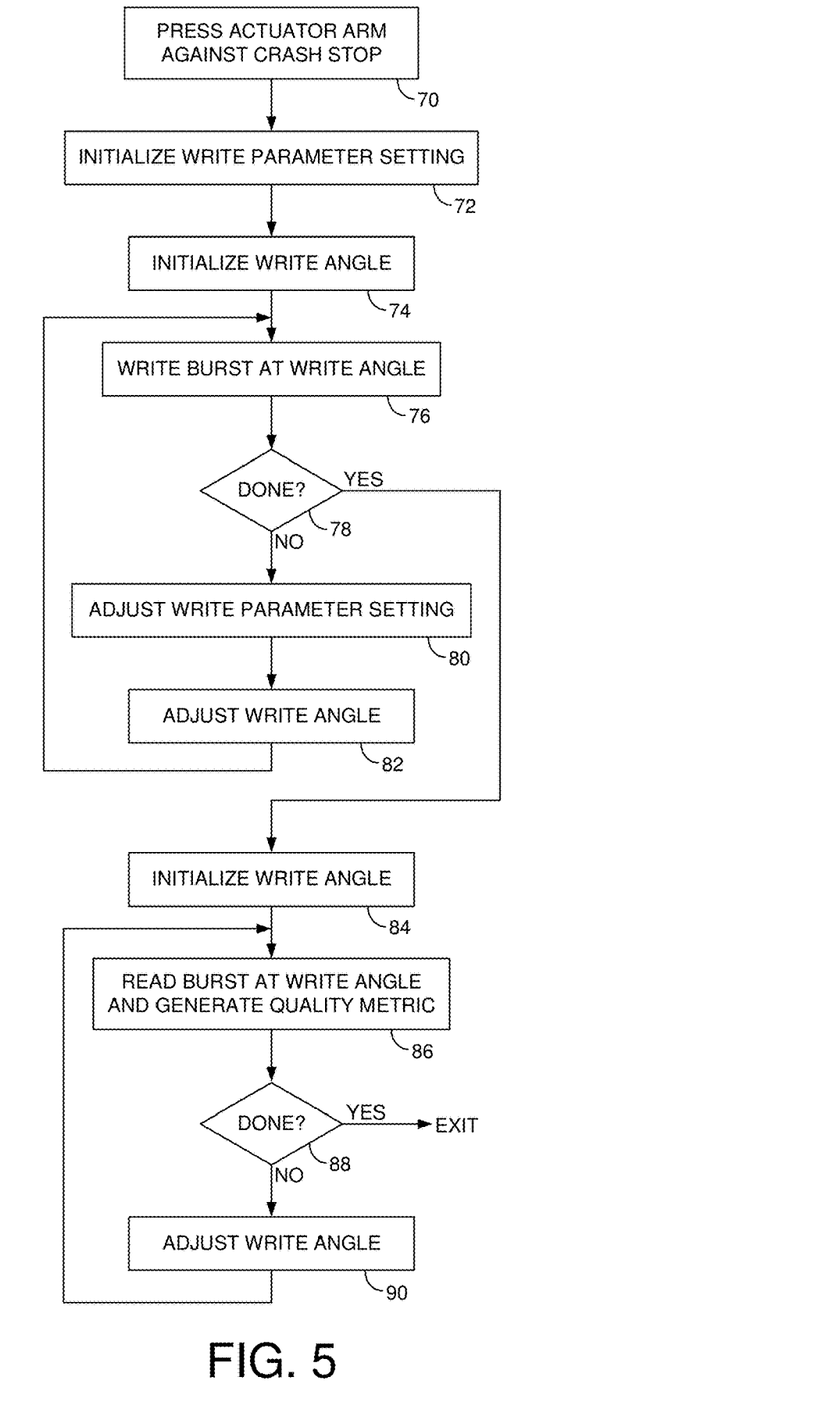
FIG. 5 is a flow diagram according to an embodiment wherein multiple bursts are written with a different write parameter setting during a first revolution of the disk surface, and then each burst is read during a second revolution of the disk surface.

In another embodiment, overshooting the write parameter setting may not be a concern, and so the bursts may be written with different write parameter settings over a single revolution of the disk surface. An example of this embodiment is shown in the flow diagram of FIG. 5, wherein after pressing the actuator arm against the crash stop (block 70), a write parameter setting is initialized at block 72 (e.g., to a low value) and a write angle is initialized (block 74). During a first revolution of the disk surface, a burst is written at the write angle (block 76), and if there are more write parameter settings at block 78, the write parameter setting is adjusted at block 80 (e.g., incremented) and the write angle is adjusted at block 82 (e.g., incremented). Another burst is written at the adjusted write angle using the adjusted write parameter setting (block 76), and this process continues until a number of bursts have been written over the range of parameter settings to be tested. During a second revolution of the disk, the write angle is initialized (block 84) and the corresponding burst at the write angle is read to generate the corresponding quality metric (block 86). The write angle is adjusted (block 90) and the flow diagram repeated until, for example, the measured quality metric achieves a target value at block 88.

Figure 6:
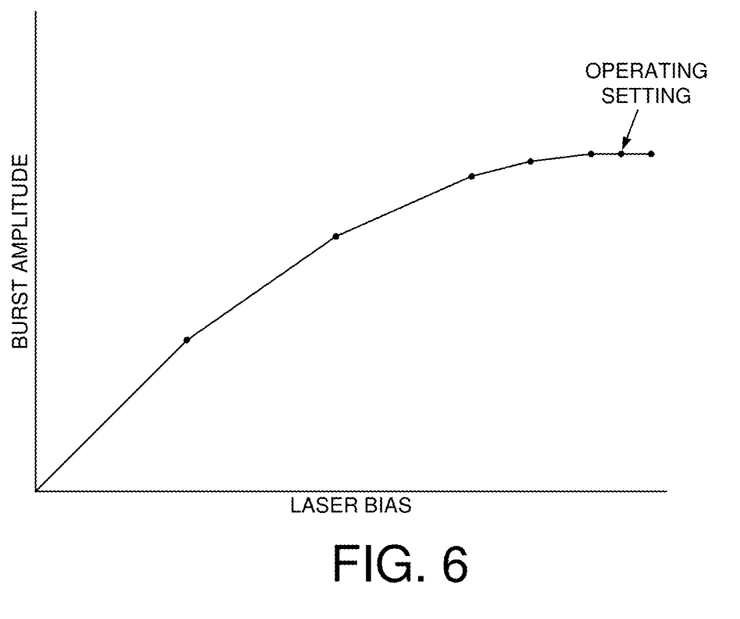
FIG. 6 shows an embodiment wherein the write parameter comprises a bias applied to a laser and the quality metric measured when reading each burst comprises a burst amplitude.

An operating setting for any suitable write parameter may be configured in the above described embodiments, wherein in an embodiment shown in FIG. 6, an operating setting for a bias (e.g., voltage or current) applied to a laser may be configured by writing/reading the bursts. In this embodiment, the quality metric measured by reading each burst comprises a burst amplitude which may be generated, for example, by integrating the read signal while reading the burst. In this embodiment, the laser bias is initialized to a low value to write/read a burst and measure the corresponding burst amplitude. The laser bias is then incremented in order to write/read the next burst and measure the corresponding burst amplitude. In one embodiment, the operating setting for the laser bias is configured as the setting when the burst amplitude saturates as shown in FIG. 6. In one embodiment, the laser bias may be incremented initially by a coarse value and then incremented by a fine value as the burst amplitude measurement approaches saturation.

In one embodiment, the control circuitry 24 is configured to self-servo write the embedded servo sectors $34_1$-$34_N$ that define the data tracks 36 shown in FIG. 2A. The control circuitry 24 may self-servo write the servo sectors $34_1$-$34_N$ in any suitable manner such as by propagating the servo bursts across the disk surface. In another embodiment, the control circuitry 24 may write an intermediate set of spiral tracks on the disk surface to facilitate servoing the head while writing the servo sectors $34_1$-$34_N$. Regardless as to the self-servo writing technique, in one embodiment the control circuitry 24 configures an operating setting for one or more write parameters prior to executing the self-servo writing operation. However prior to executing the self-servo writing, there may not be any servo information recorded on the disk surface (i.e., the disk surface may be essentially blank). Accordingly in the embodiments described above, the actuator arm is pressed against a crash stop (e.g., inner or outer diameter crash stop) while writing/reading bursts so that servo information is not needed to control the position of the head in order to calibrate the write parameters. In one embodiment, a disk locked clock is synchronized to back electromotive force (BEMF) zero crossings of a spindle motor configured to rotate the disk, thereby synchronizing the disk locked clock to the rotation speed of the disk. The disk locked clock may then be used to identify the target write angles for each burst, as well as clock write/read circuitry when writing/reading the bursts.

In one embodiment, the control circuitry may execute a "scan read" when reading one or more bursts and measuring the corresponding quality metric. A scan read in this embodiment means the head is scanned radially across the burst over multiple revolutions of the disk surface by decrementing the bias applied to the actuator (e.g., VCM 18 in FIG. 2A). That is with each decrement of the actuator bias, the head moves a corresponding increment away from the crash stop position. The burst is read to measure the quality metric (e.g., burst amplitude) during a revolution of the disk surface, the actuator bias is again decremented to increment the head position, the burst metric is read again, and so on. This embodiment may help compensate for the head deviating from a circular trajectory while writing the bursts due to a "spongy" response when pressing the actuator arm against, for example, a rubber crash stop. That is executing a scan read of the bursts may, in one embodiment, ensure the head passes over the center of each burst when the center position is unknown due to a spongy response of the crash stop. In one embodiment, multiple scan reads of a burst may be executed to ensure the head passed over the center of the burst during at least one of the revolutions.

In one embodiment, a radial band of the disk surface that corresponds to the general position of the head while pressing the actuator arm against the crash stop may be erased before and/or after writing the bursts (e.g., the bursts shown in FIG. 3A). In one embodiment, the write parameter settings may be configured with nominal settings to help erase the radial band prior to writing/reading the bursts, and in another embodiment, the radial band may be erased after writing/reading the bursts using the calibrated settings for the write parameters. In one embodiment, a "scan erase" is executed similar to the "scan read" embodiment described above. That is, in one embodiment a scan erase is executed by decrementing the actuator bias over multiple revolutions of the disk surface so that the head scans across the radial band while configured into an "erase" mode (e.g., AC or DC erase). Similar to a scan read, in one embodiment a scan erase may be executed multiple times to ensure the entire radial band is erased similar to scanning an erasure over a white board.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk surface;
an actuator;
an actuator arm actuated by the actuator;
a head actuated over the disk surface by the actuator arm; and
control circuitry configured to:
control the actuator to press the actuator arm against a crash stop in order to write a plurality of bursts on the disk surface each with a different setting for a write parameter, and read each burst in order to measure a quality metric for each burst, the writing of the plurality of bursts comprising:
writing a first burst at a first write angle of the disk surface, and
writing a second burst at a second write angle of the disk surface, and
configure an operating setting for the write parameter based on the measured quality metrics.

2. The data storage device as recited in claim 1, wherein the control circuitry is further configured to:
during a first revolution of the disk surface, write the first burst at the first write angle;
during a second revolution of the disk surface, read the first burst to generate a first quality metric;
during a third revolution of the disk surface, write the second burst at the second write angle;
during a fourth revolution of the disk surface, read the second burst to generate a second quality metric; and
configure the operating setting for the write parameter based on the first and second measured quality metrics.

3. The data storage device as recited in claim 1, wherein the control circuitry is further configured to:
during a first revolution of the disk surface, write the first burst at the first write angle and write the second burst at the second write angle during a first revolution of the disk surface;
during a second revolution of the disk surface, read the first burst to generate a first quality metric and read the second burst to generate a second quality metric; and
configure the operating setting for the write parameter based on the first and second measured quality metrics.

4. The data storage device as recited in claim 1, wherein:
the head comprises a write coil; and
the write parameter comprises a write current applied to the write coil.

5. The data storage device as recited in claim 1, wherein:
the head comprises a write assist element to assist a write coil; and
the write parameter comprises a bias applied to the write assist element.

6. The data storage device as recited in claim 5, wherein the write assist element comprises a laser, the quality metric is a burst amplitude, and the control circuitry is further configured to:
increase the bias applied to the laser prior to writing each burst; and
configure the operating setting for the bias based on when the burst amplitude saturates.

7. The data storage device as recited in claim 1, wherein the control circuitry is further configured to servo write the disk surface with servo sectors using the operating setting for the write parameter.

8. The data storage device as recited in claim 1, wherein the control circuitry is further configured to erase the bursts from the disk surface using the configured operating setting for the write parameter.

9. A data storage device comprising:
a disk surface;
an actuator;
an actuator arm actuated by the actuator;
a head actuated over the disk surface by the actuator arm; and
control circuitry configured to:
apply a control bias to the actuator to press the actuator arm against a crash stop in order to write a plurality of bursts on the disk surface each with a different setting for a write parameter, and scan read each burst in order to measure a quality metric for each burst, the writing of the plurality of bursts comprising:
write a first burst at a first write angle of the disk surface; and
write a second burst at a second write angle of the disk surface, and
configure an operating setting for the write parameter based on the measured quality metrics.

10. The data storage device as recited in claim 9, wherein the control circuitry is further configured to scan read each burst by decreasing the control bias over multiple revolutions of the disk surface in order to scan the head radially over each burst.

11. The data storage device as recited in claim 9, wherein the control circuitry is further configured to:
during a first revolution of the disk surface, write the first burst at the first write angle;
during a second revolution of the disk surface, read the first burst to generate a first quality metric;
during a third revolution of the disk surface, write the second burst at the second write angle;
during a fourth revolution of the disk surface, read the second burst to generate a second quality metric; and
configure the operating setting for the write parameter based on the first and second measured quality metrics.

12. The data storage device as recited in claim 10, wherein the control circuitry is further configured to:
during a first revolution of the disk surface, write the first burst at the first write angle and write the second burst at the second write angle during a first revolution of the disk surface;
during a second revolution of the disk surface, read the first burst to generate a first quality metric and read the second burst to generate a second quality metric; and
configure the operating setting for the write parameter based on the first and second measured quality metrics.

13. The data storage device as recited in claim 9, wherein:
the head comprises a write coil; and
the write parameter comprises a write current applied to the write coil.

14. The data storage device as recited in claim 9, wherein:
the head comprises a write assist element to assist a write coil; and
the write parameter comprises a bias applied to the write assist element.

15. The data storage device as recited in claim 14, wherein the write assist element comprises a laser, the quality metric is a burst amplitude, and the control circuitry is further configured to:
increase the bias applied to the laser prior to writing each burst; and configure the operating setting for the bias based on when the burst amplitude saturates.

16. The data storage device as recited in claim 9, wherein the control circuitry is further configured to servo write the disk surface with servo sectors using the operating setting for the write parameter.

17. The data storage device as recited in claim 9, wherein the control circuitry is further configured to erase the bursts from the disk surface using the configured operating setting for the write parameter.

18. A data storage device comprising:
 a disk surface;
 an actuator;
 an actuator arm actuated by the actuator;
 a head actuated over the disk surface by the actuator arm; and
 a means for controlling the actuator to press the actuator arm against a crash stop in order to write a plurality of bursts on the disk surface each with a different setting for a write parameter, and read each burst in order to measure a quality metric for each burst, the writing of the plurality of bursts comprising:
  writing a first burst at a first write angle of the disk surface, and
  writing a second burst at a second write angle of the disk surface, and
 a means for configuring an operating setting for the write parameter based on the measured quality metrics.

19. A data storage device comprising:
 a disk surface;
 an actuator;
 an actuator arm actuated by the actuator;
 a head actuated over the disk surface by the actuator arm, the head comprising a write assist element to assist a write coil, the write assist element comprising a laser; and
 control circuitry configured to:
  control the actuator to press the actuator arm against a crash stop in order to write a plurality of bursts on the disk surface each with a different setting for a write parameter, increase a bias applied to the laser prior to writing each burst, read each burst in order to measure a quality metric for each burst, the quality metric comprising a burst amplitude, and
  configure an operating setting for the write parameter based on the measured quality metrics, the write parameter comprising the bias applied to the laser, wherein the operating setting for the bias is configured based on when the burst amplitude saturates.

20. A data storage device comprising:
 a disk surface;
 an actuator;
 an actuator arm actuated by the actuator;
 a head actuated over the disk surface by the actuator arm; and
 control circuitry configured to:
  apply a control bias to the actuator to press the actuator arm against a crash stop in order to write a plurality of bursts on the disk surface each with a different setting for a write parameter, and scan read each burst in order to measure a quality metric for each burst, wherein each burst is scan read by decreasing the control bias over multiple revolutions of the disk surface in order to scan the head radially over each burst; and
  configure an operating setting for the write parameter based on the measured quality metrics.

21. A data storage device comprising:
 a disk surface;
 an actuator;
 an actuator arm actuated by the actuator;
 a head actuated over the disk surface by the actuator arm, the head comprising a write assist element to assist a write coil, the write assist element comprising a laser; and
 control circuitry configured to:
  apply a control bias to the actuator to press the actuator arm against a crash stop in order to write a plurality of bursts on the disk surface each with a different setting for a write parameter, increase a bias applied to the laser prior to writing each burst, and scan read each burst in order to measure a quality metric for each burst, the quality metric comprising a burst amplitude, and
  configure an operating setting for the write parameter based on the measured quality metrics, the write parameter comprising the bias applied to the laser, wherein the operating setting for the bias is configured based on when the burst amplitude saturates.

* * * * *